United States Patent
Vemireddy et al.

(10) Patent No.: US 11,334,662 B2
(45) Date of Patent: May 17, 2022

(54) TAMPER-EVIDENT TRAVEL DEVICES EQUIPPED WITH SECURE RE-IMAGE FILE(S)

(71) Applicant: Bank of America Corporation, Charlotte, NC (US)

(72) Inventors: Vijaya L. Vemireddy, Plano, TX (US); Brandon Sloane, Charlotte, NC (US); Harvey Summers, Richmond, VA (US); Eileen D. Bridges, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 195 days.

(21) Appl. No.: 16/928,843

(22) Filed: Jul. 14, 2020

(65) Prior Publication Data

US 2022/0019654 A1   Jan. 20, 2022

(51) Int. Cl.
*G06F 21/50* (2013.01)
*G06F 21/32* (2013.01)
(Continued)

(52) U.S. Cl.
CPC .............. *G06F 21/50* (2013.01); *G06F 1/14* (2013.01); *G06F 21/31* (2013.01); *G06F 21/32* (2013.01);
(Continued)

(58) Field of Classification Search
CPC . G06F 21/50; G06F 1/14; G06F 21/32; G06F 21/606; G06F 21/70;
(Continued)

(56) References Cited

U.S. PATENT DOCUMENTS

| | | | |
|---|---|---|---|
| 7,680,281 B2 * | 3/2010 | Fiatal | H04L 63/08 380/255 |
| 8,719,909 B2 * | 5/2014 | Fitzgerald | G06F 21/86 726/7 |

(Continued)

FOREIGN PATENT DOCUMENTS

| | | | | |
|---|---|---|---|---|
| JP | 5915872 B2 | * | 5/2016 | |
| KR | 20100114110 A | * | 10/2010 | |
| WO | WO-2011087499 A1 | * | 7/2011 | G06F 21/554 |

OTHER PUBLICATIONS

"The Known Traveller: Unlocking the Potential of Digital Identity for Secure and Seamless Travel," http://www3.weforum.org/docs/WEF_The_Known_Traveller_Digital_Identity_Concept.pdf, World Economic Forum, Jan. 2018.

(Continued)

*Primary Examiner* — Shahriar Zarrineh
(74) *Attorney, Agent, or Firm* — Weiss & Arons LLP (57) ABSTRACT

A method of enhancing travel security features associated with a mobile device is provided. The method may include operating a time clock to store a start device confiscation time in a memory and to store an end device confiscation time in the memory, monitoring the mobile device to detect tampering occurring between the start device confiscation time and the end device confiscation time, and in response to the detecting of tampering, prompting the user for a secure identifier. Upon receipt of the secure identifier, the method may include opening a secure i/o pathway to a re-image file. The secure i/o pathway preferably enables execution of an executable re-image file. The re-image file may be used to re-image a software image of the mobile device. The re-image file may contain a pre-tampered image of the mobile device.

21 Claims, 9 Drawing Sheets

(51) Int. Cl.
*G06F 21/70* (2013.01)
*G06F 21/60* (2013.01)
*G06F 1/14* (2006.01)
*G06F 21/31* (2013.01)

(52) U.S. Cl.
CPC ............ G06F 21/606 (2013.01); G06F 21/70 (2013.01); *G06F 2221/034* (2013.01)

(58) Field of Classification Search
CPC .... G06F 2221/034; G06F 21/31; G06F 21/57; G06F 21/572; G06F 21/6245
See application file for complete search history.

(56) References Cited

U.S. PATENT DOCUMENTS

| | | | | |
|---|---|---|---|---|
| 9,665,870 | B1* | 5/2017 | Rezayee | G06Q 20/4012 |
| 10,664,622 | B2* | 5/2020 | Printemps | G06Q 20/40 |
| 2005/0183072 | A1* | 8/2005 | Horning | G06F 21/14 |
| | | | | 717/140 |
| 2006/0242326 | A1* | 10/2006 | Camiel | G06F 1/14 |
| | | | | 709/246 |
| 2009/0323972 | A1* | 12/2009 | Kohno | H04L 9/0891 |
| | | | | 380/284 |
| 2011/0150212 | A1* | 6/2011 | Spalka | H04L 9/3247 |
| | | | | 380/44 |
| 2013/0091564 | A1* | 4/2013 | Fitzgerald | G06F 21/88 |
| | | | | 726/17 |
| 2016/0042202 | A1* | 2/2016 | Murray | A45C 11/00 |
| | | | | 320/108 |
| 2017/0140364 | A1* | 5/2017 | Saitoh | H04M 1/72403 |
| 2017/0353497 | A1* | 12/2017 | Bradley | H04L 63/20 |
| 2018/0234393 | A1* | 8/2018 | Gram | H04L 9/0872 |
| 2019/0125457 | A1* | 5/2019 | Parihar | A61B 17/07207 |
| 2019/0207953 | A1* | 7/2019 | Klawe | G06Q 20/382 |

OTHER PUBLICATIONS

"Travel Identity of the Future," https://www.sita.aero/resources/type/white-papers/travel-identity-of-the-future, SITA, 2016.

* cited by examiner

TAMPER-EVIDENT TRAVEL DEVICES EQUIPPED WITH SECURE RE-IMAGE FILE(S)

FIELD OF TECHNOLOGY

This disclosure relates to trusted travel devices.

BACKGROUND

When a person is travelling, one or more of his devices may be removed from his possession for investigation. Such removal may include inspection. Such removal may include tampering. Such tampering may include installing wire-tapping applications on the mobile device. Such tampering may involve installing other listening or logging devices on the mobile device.

Various conventional approaches exist to responding to such confiscation, tampering and installation of such listening devices. These approaches include browser containerization, virtual sandbox, etc., in order to allow for continued secure web interaction during travel. As technology develops further, it is important to continue to improve mobile devices, and methods for using the mobile devices, that are secure.

Further, it would be desirable to provide systems and methods that mitigate the possibility of breach of mobile device security.

It would be further desirable to provide systems and methods that identify the occurrence of such tampering and/or other breach.

Assuming breach, it would be desirable to provide systems and methods that can remediate a post-breach condition.

SUMMARY OF THE DISCLOSURE

It is an object of this disclosure to provide systems and methods that mitigate the possibility of such breach.

It is an object of this disclosure to provide systems and methods that identify the occurrence of such tampering and/or other breach.

It is an object of this disclosure to provide systems and methods that can remediate a post-breach condition.

A mobile device including enhanced travel security features is provided. The mobile device may include a memory and a settable time clock. The time clock preferably operates to store a start device confiscation time in the memory and to store an end device confiscation time in the memory.

In some embodiments, the mobile device may include a button or sensor that renders the device inoperable for a set period of time and/or requires codes to unlock the device. In certain embodiments, input of invalid codes may render the device inoperable, the data within the device unrecoverable or both after a specific number of unsuccessful attempts.

In some embodiments, codes for user input may be part of a multifactor authentication sequence. Such a multifactor authentication sequence may include input of correct code(s), a successful login, and/or detection of a pre-authorized RFID or pairing with a pre-authorized Bluetooth device.

The mobile device may also include at least one monitor device. The monitor device may detect tampering with the mobile device. The tampering may occur between the start device confiscation time and the end device confiscation time.

The mobile device may also include an executable re-image file. The re-image file may be configured to re-image, upon a command from the mobile device, a software image of the mobile device. The re-image file may preferably be stored in the memory prior to the start device confiscation time.

The mobile device may also include a secure i/o pathway through the memory to the re-image file. The secure i/o pathway may be unsecured at an i/o point to the memory but secure at an i/o point within the memory. The i/o point within the memory may provide a traversable gateway to the re-image file.

After the end device confiscation time and in response to the detecting of said tampering, the mobile device preferably prompts the user for a secure identifier. Upon receipt of the secure identifier, the mobile device may open the traversable gateway and execute the re-image file.

In some embodiments, the mobile device may allow for inspection showing user-configured information. This user-configured information may or may not reflect the true state of the mobile device. This information should preferably be provided from a functionally separate container—i.e., a container that exists and functions preferably separate and apart from the core container of the mobile device. Such a mode of self-configurable display preferably provides an appearance of having complied without disclosing secure information. In this mode, secured information is preferably not accessible to a third party.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Breach protection according to the embodiments may include the ability to lock down one or more ports during confiscation. Such lock-down may preferably be implemented, in certain embodiments, by toggling a lock-down switch. Such port lock-down can protect against a prospective tamperer having access to the port(s) that would allow tampering.

In place of a switch, or complementary thereto, other embodiments may include an internal sensor that detects uncharacteristic rough handling of the mobile device, greater than a pre-determined distance of separation from an RFID chip or Bluetooth device, or unauthorized attempt(s) to access information by physical or digital means.

Such toggling can be implemented using a hard-wired switch that presents on the exterior of the mobile device. Such a hard-wired switch may mechanically disconnect the internal components of the device from the port(s) that may be used for tampering.

Such toggling can be implemented using a wireless capable device. The wireless capable device may be configured to send a wireless signal to the mobile device. The wireless signal may cause an internal disconnection, such as a software disconnection or hardware disconnection, of the port(s)—thereby blocking access of a prospective tamperer to the internal workings of the mobile device.

In certain embodiments of the disclosure, an audio and/or visual alarm can indicate the past occurrence of a breach using a strobe on device—or at remote location. Such a breach may include unauthorized electronic communications with the mobile device. Such a breach may include tampering with the electronic components of the mobile device. Such a breach may include implanting a wire-tapping device, a text-tapping device or any other tampering device within the mobile device hardware and/or software.

In certain embodiments, multi-factor authentication, such a password, a One-Time-Password (OTP), a biometric characteristic, a passphrase or other authentication may be required to access the device during travel.

Other systems and methods for preventing breach may include monitoring the device during the period of confiscation. Such monitoring may include the state of the machine, or some aspect of the machine. Such monitoring may include monitoring and recording performance of certain aspects of the machine during confiscation. Part of the monitoring may include using the phone clock for capturing the window of time of confiscation. Thereafter, the device may be configured to review performance history of a CPU usage monitor, a bandwidth monitor, a network traffic monitor, a website presentation monitor or other relevant monitor to identify device tampering during confiscation.

In some embodiments, device tampering may be linked to the detection of anomalous behavior derived from the monitoring of one of the listed monitors.

When breach occurs, some embodiments of the disclosure may involve a hard-wired mechanism that mitigates the effects of the breach. The hard-wired mechanism may reside in the device. The hard-wired mechanism may provide the ability to re-image the device post-breach.

The re-image is preferably hard-wired to a pre-travel image. The re-image may be pre-loaded in a pre-determined, secure, location in the memory. The re-image may include a signature lockdown file. Re-imaging the device to a pre-travel state may preferably eliminate the effects of any tampering.

In some embodiments of the invention, integrity verification information may also be set up in the pre-determined, secure, location in the file. As such, the location in the memory may contain hardware and/or software that preferably cannot be overwritten which contains biometric information, calendar and scheduling information, online-offline timing information and/or any other integrity verification information or other relevant information.

In some embodiments—the software associated with integrity information may be secured by encryption, hashing algorithms, distributed ledgers such as blockchains or any other suitable security measures. In certain embodiments, such a blockchain may be protected by limiting write access to one or more secure locations on the chain, while allowing read access from numerous locations on the chain.

Hardware protection for such overwriting may include placing epoxy on the write-access portions of the solder traces and/or the chips themselves that include the secure information. As such, gaining write access to such mechanically protected areas would require a removal of the epoxy, or other protective fixate. This removal would cause destruction of the system prior to allowing the system to be compromised by tamperer.

In certain embodiments, the device may capture the state of the machine and check the state of the machine prior to and after device inspection. This may be considered •mobile threat defense• technology. Such technology may include the capability to detect and inform when a security breach has occurred during confiscation. This information may be derived from the delta observed between the pre- and post-confiscation machine.

Certain embodiments of the disclosure may also include location-based services to help provide additional information, reminders or social distancing, etc. These embodiments may also include sending pro-active notifications to travelers.

A mobile device according to the disclosures includes enhanced travel security features. The mobile device includes a memory and a settable time clock. The time clock preferably operates to store a start device confiscation time in the memory and to store an end device confiscation time in the memory.

The mobile device includes at least one monitor device. The monitor device may act to detect tampering with the mobile device. The tampering may occur between the start device confiscation time and the end device confiscation time.

The mobile device may also include an executable re-image file. The image file may be used to re-image, upon a command from the mobile device, a software image of the mobile device. The re-image file may be stored in the memory prior to the start device confiscation time.

The mobile device may also include a secure i/o pathway through the memory to the re-image file. After the end device confiscation time and in response to the detecting of the tampering, the mobile device may prompt the user for a secure identifier. Upon receipt of the secure identifier, the mobile device may open the secure i/o pathway and execute the re-image file.

In some embodiments, the secure i/o pathway may be traversable only in response to an input to the mobile device of a user biometric parameter.

In some embodiments, the secure i/o pathway may be traversable only in response to an input to the mobile device of a one-time password (OTP).

In other embodiments, the secure i/o pathway may be traversable only in response to an input to the mobile device of a user Personal Identification Number (PIN). In yet other embodiments, the secure i/o pathway may be traversable in response to a combination of an input of two or more of a user biometric parameter, a one-time password (OTP), a passphrase and a personal identification number (PIN).

In certain embodiments, the mobile device may include an external communications port and a toggleable communications port lock. The toggleable port lock may be used to lock down communications through the external communications port.

In some embodiments, the toggleable port lock may be a hardware device that presents, at least partially, on an external housing of the mobile device.

In other embodiments, the toggleable port lock may be a software device that is toggleable using a remote, wirelessly-enabled, port lock signal generating device.

Other embodiments may include a system for increasing security of mobile devices. The system and/or the mobile device may include enhanced travel security features.

The mobile device may include a memory and a settable time clock. The settable time clock may operate to store a start device confiscation time in the memory and to store an end device confiscation time in the memory. At least one monitor device selected from the group consisting of a network traffic monitor device, a bandwidth usage monitor device and a central processing usage monitor device may be used to record the activity between the start device confiscation time and the end device confiscation time in the memory. The monitor device may flag an anomalous device condition that occurred between the start device confiscation time and the end device confiscation time.

In some embodiments, the start device confiscation time and the end device confiscation time is determined by user command. That is to say—the user may actuate or otherwise initiate the operation of the clock in order to start the operation of the clock at the beginning of the confiscation time. The user may also, under certain conditions or in certain embodiments, actuate or otherwise terminate the operation of the clock in order to record the end point the confiscation time. The clock initiate command may also initiate operation of one or more device monitors of the types of device monitors set forth herein.

In some embodiments, the start device confiscation time may be fixed and recorded when the mobile device passes a threshold distance from the mobile device user. In some embodiments, the end device confiscation time may be fixed and recorded when the mobile device returns within the threshold distance of the user.

In certain embodiments, whether the mobile device passes the threshold distance may be determined, at least in part, by calculating a distance between the mobile device and a second device, preferably mobile, located on the user's person.

In other embodiments, whether the mobile device passes the threshold distance can be determined, at least in part, by calculating a travel time following removal of the mobile device from the person of the user until the motion of the device ceases. The determination as to whether the mobile device returns within the threshold distance can, similar to above, be calculated by determining a proximity of the mobile device to the person of the user. In such embodiments, the determination as to whether the mobile device returns to the person of the user can be effectuated by the retrieval, using the mobile device, of biometric signals related to the user such as gait, sound, and/or any other suitable biometric user-identifying signals.

In some embodiments, the flagging of the anomalous device condition may include providing a visual indication on the mobile device of the occurrence of the anomalous device condition.

In certain embodiments, the anomalous device condition may correspond to installation of a snooping application on the mobile device. This may occur during the confiscation of the device.

In some embodiments, the anomalous device condition may correspond to installation of a wire-tapping application, text-intercepting or e-mail intercepting application (or hardware device) installed on the mobile device. This may occur during the confiscation of the device.

A mobile device performance review application may be implemented for determining whether a current device performance status indicates the past occurrence of the anomalous device condition. For example, if the mobile device performance review application determines the past occurrence of the anomalous device condition, the application may query whether the anomalous device condition occurred between the start device confiscation time and the end device confiscation time.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
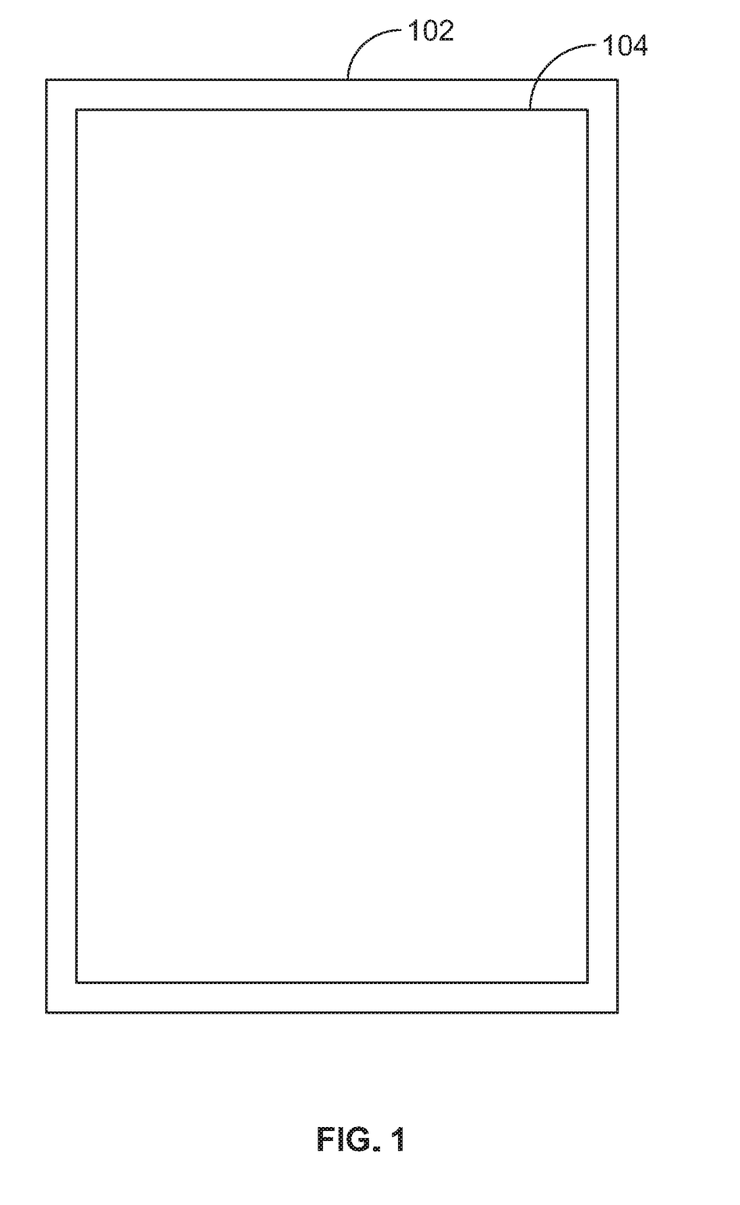
FIG. 1 is a schematic diagram of a mobile device in accordance with the principles of the disclosure.

FIG. 1 is a schematic diagram of a mobile device 102 in accordance with the principles of the disclosure. Mobile device 102 preferably includes a screen 104.

Figure 2:
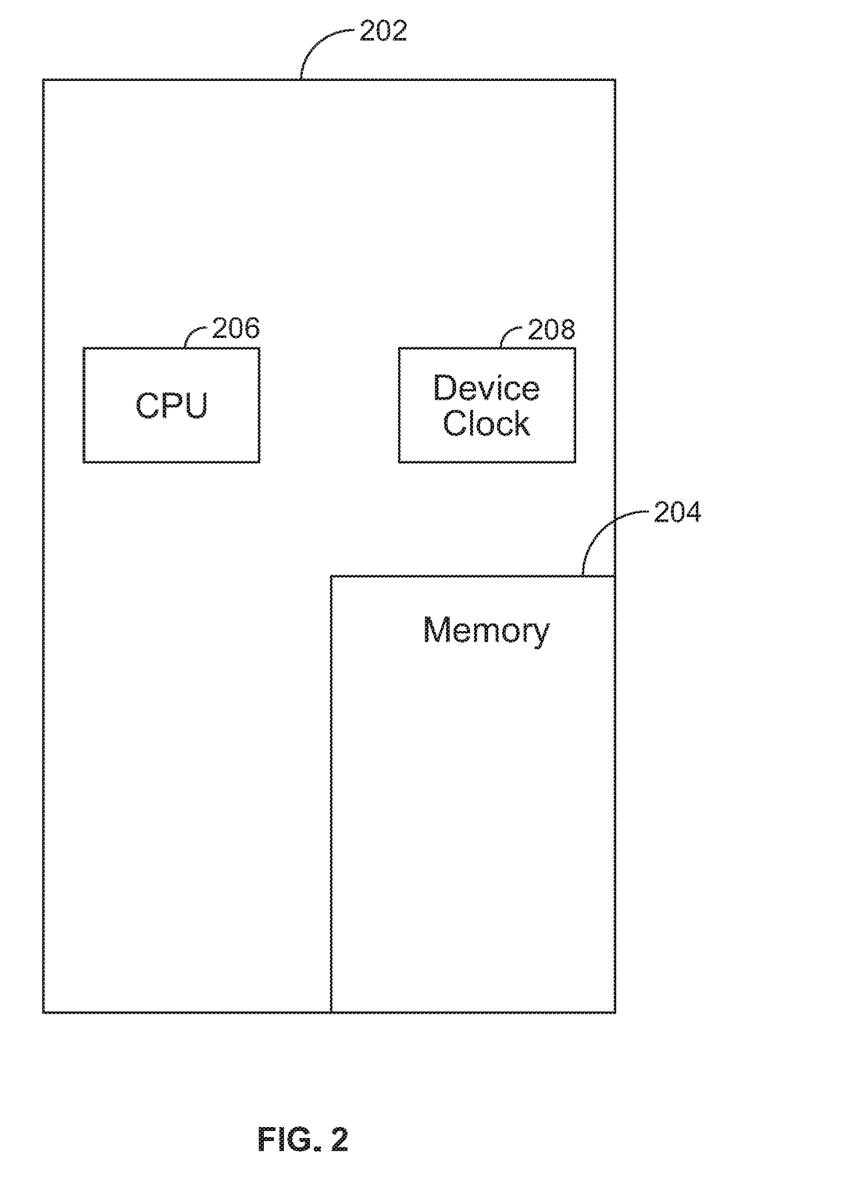
FIG. 2 is another schematic diagram of a mobile device in accordance with the principles of the disclosure.

FIG. 2 is another schematic diagram of a mobile device 202 in accordance with the principles of the disclosure. Mobile device 202 preferably includes a memory 204, a CPU 206, and a device clock 208. It should be noted that each of the components described herein should preferably be in electronic communication with one another.

Figure 3:
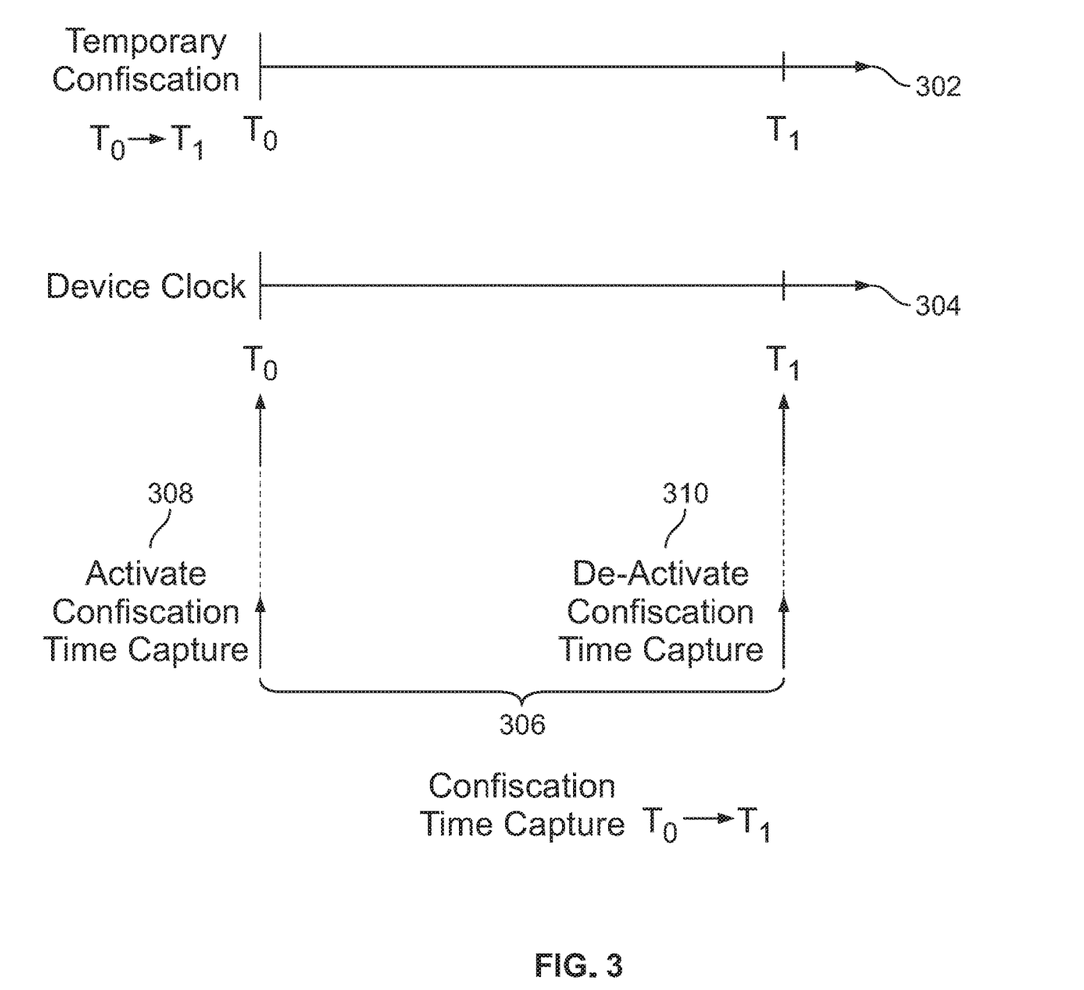
FIG. 3 is a timing diagram of mobile device clock in accordance with the principles of the disclosure.

FIG. 3 is a timing diagram of a mobile device clock in accordance with the principles of the disclosure. Temporary confiscation 302 shows a timeline of an exemplary confiscation that may occur in the setting of a domestic or foreign airport or a domestic or foreign customs office. A device clock timeline is shown at 304. The device clock 304 shows activation of the confiscation time capture at time $T_0$ and de-activation of the confiscation time capture $T_1$. Activation at $T_0$ and de-activation at $T_1$ set the confiscation time capture 306 between $T_0$ and $T_1$. All of this information can be based on activation and de-activation of device clock 304.

In addition, device clock 304 may be monitored to determine whether device clock 304 has either markedly slowed down or markedly speeded up during the confiscation. One or more of such marked changes in the operation of device clock 304 may, under certain circumstances, indicate tampering.

Figure 4:
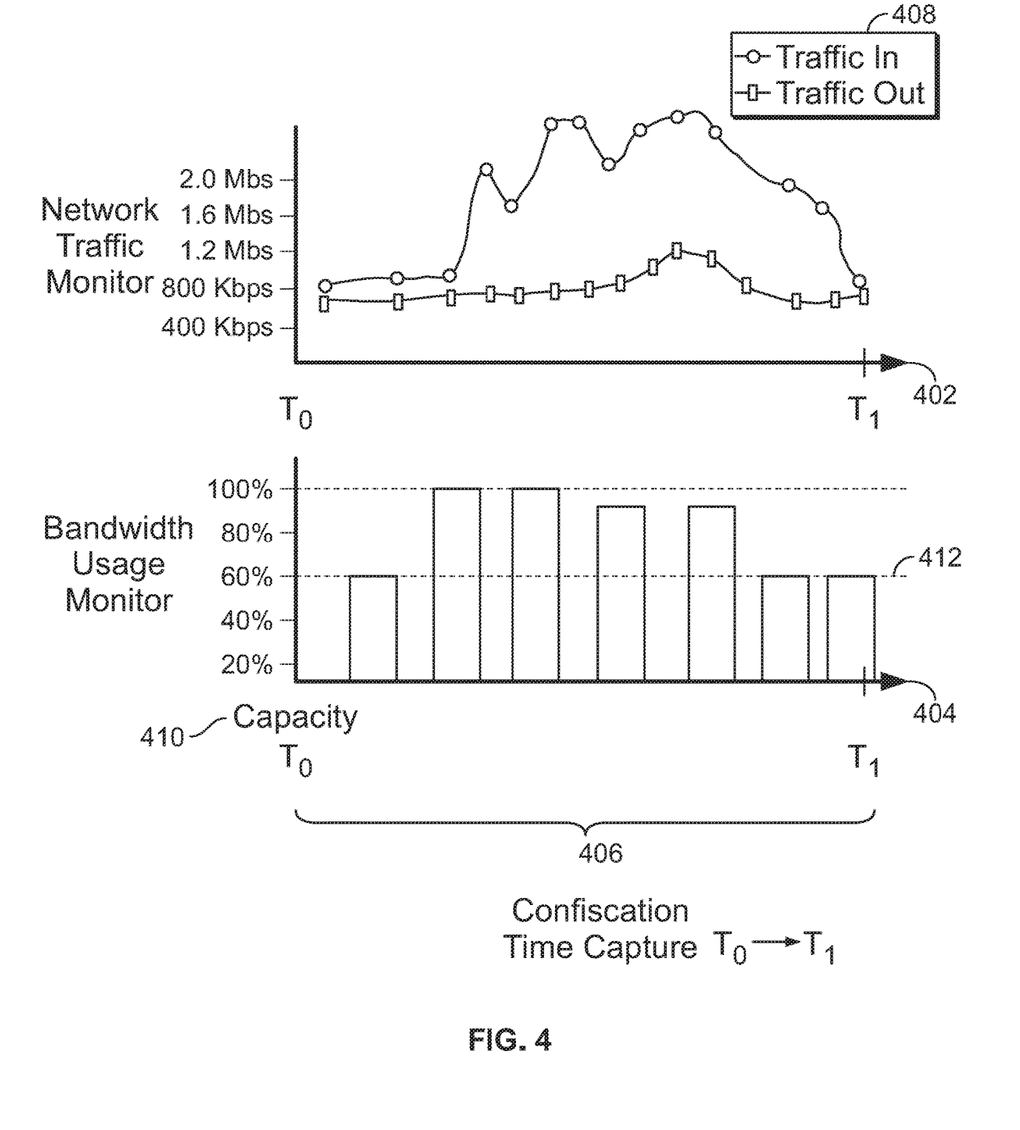
FIG. 4 are timing diagrams of an exemplary network traffic monitor and an exemplary bandwidth usage monitor in accordance with the principles of the disclosure.

FIG. 4 are timing diagrams of an exemplary network traffic monitor 402 and an exemplary bandwidth usage monitor 404 in accordance with the principles of the disclosure. It should be noted that information derived from either of network traffic monitor 402 and the bandwidth usage monitor 404 may be used to determine whether an anomalous event occurred during confiscation time capture 406.

Network traffic monitor 402 shows an exemplary traffic in/traffic out analysis. This information may be used to determine whether improper information, as characterized by a relatively high level of network activity, was transmitted or received during confiscation time capture 406.

Bandwidth usage monitor 404 shows use of bandwidth capacity during confiscation time capture 406. It should be noted that a threshold level 412 may be presented in order to enable systems and/or methods according to the disclosure to quantify bandwidth usage and what may be considered an anomalous condition during the confiscation time capture 406.

Figure 5:
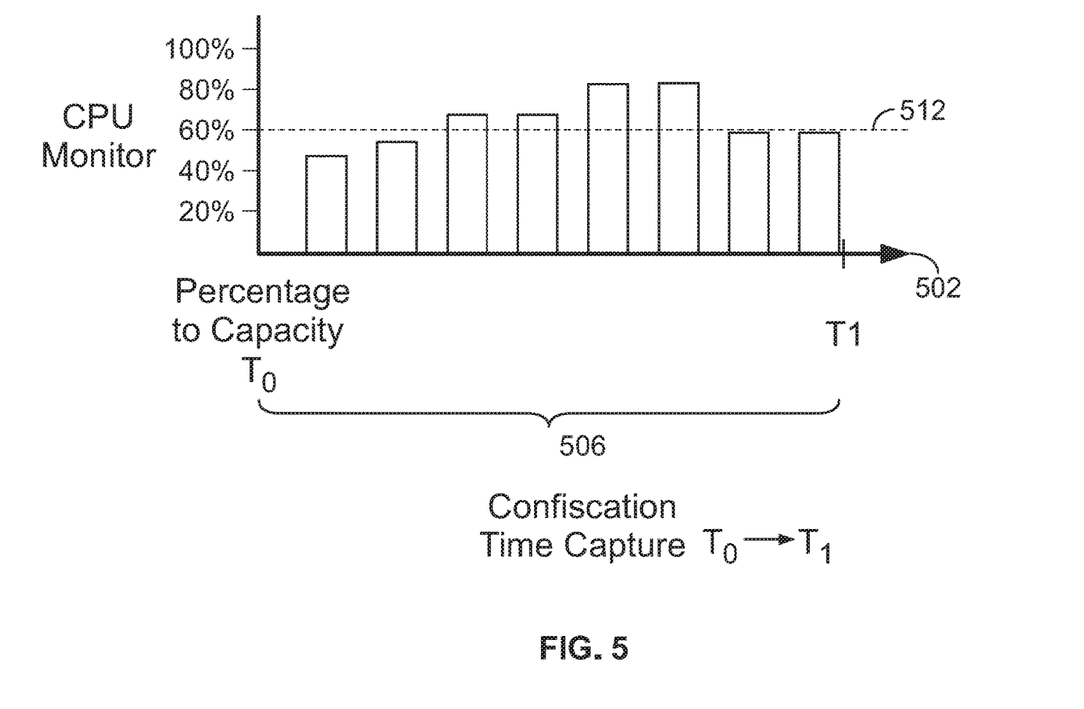
FIG. 5 is a timing diagram of a central processing unit (CPU) usage monitor in accordance with the principles of the disclosure.

FIG. 5 is a timing diagram of a central processing unit (CPU) usage monitor 502 in accordance with the principles of the disclosure. It should be noted that a threshold level 512 may be presented in order to enable systems and/or methods according to the disclosure to quantify CPU usage and to classify what may be considered an anomalous condition during the confiscation time capture 506.

Figure 6:
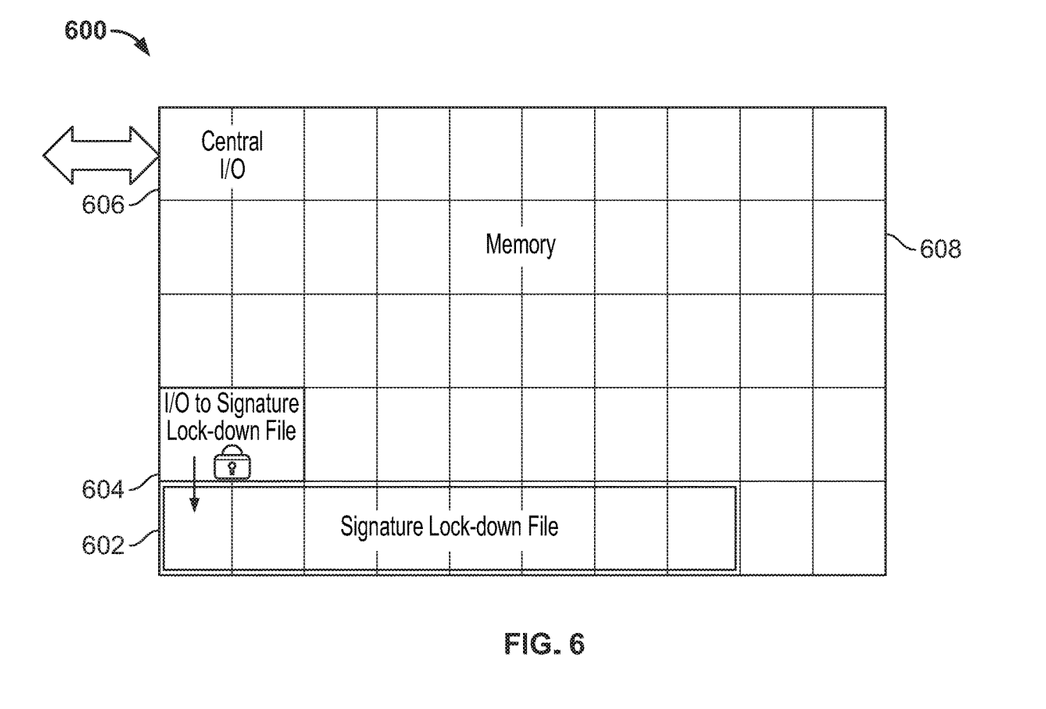
FIG. 6 is a schematic diagram of memory for use in systems and/or methods in accordance with the principles of the disclosure.

FIG. 6 is a schematic diagram of memory 608 for use in systems and/or methods in accordance with the principles of the disclosure. At 606, central I/O shows a connection to memory 608. Within memory 608, there may also be a signature lock-down file 602.

Signature lock-down file 602 may preferably be a pre-confiscation image file. Such a file 602 may preferably be sealed off from the rest of memory by a hardware or software lock at 604. This lock protects the I/O to the signature lock-down file. This lock may be opened by input of a biometric characteristic associated with the user. This lock may be opened by unique identifier known to, and input by, the user. This lock may be opened by a one-time password transmitted to the user using a communication channel other than the mobile device associated with the user. This lock may be opened by a one-time password transmitted to the user using a communication channel which forms part of the mobile device. This lock may be opened by a combination of more than one of the biometric identifier, the password the OTP, or any other suitable secure information.

Figure 7:
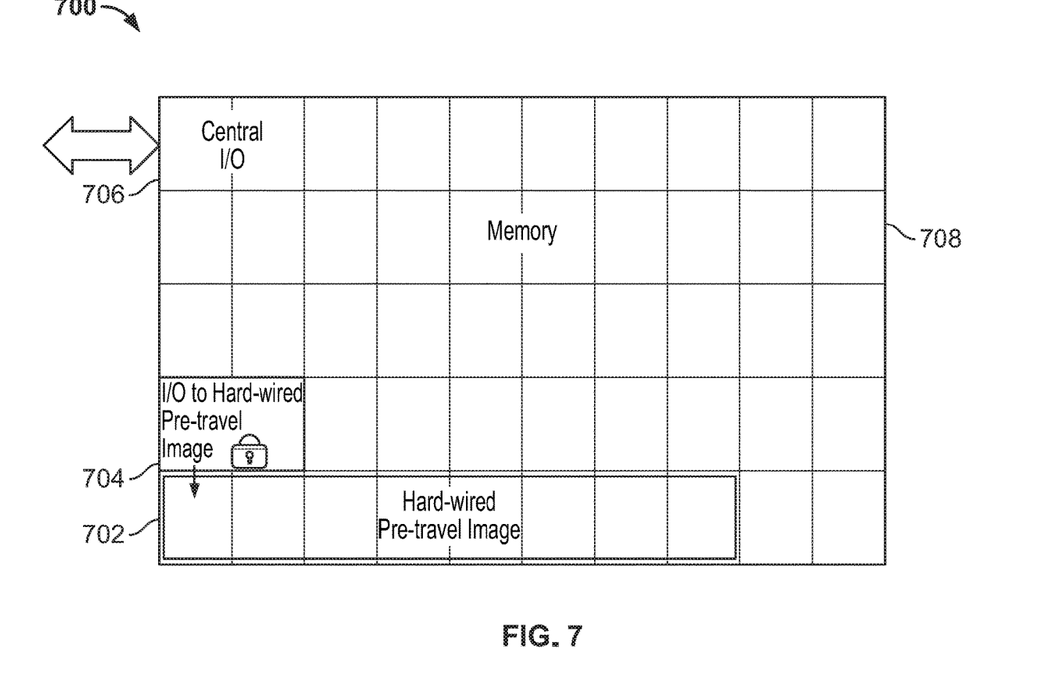
FIG. 7 is another schematic diagram of memory for use in systems and/or methods in accordance with the principles of the disclosure.

FIG. 7 is another schematic diagram of memory for use in systems and/or methods in accordance with the principles of the disclosure. FIG. 7 is similar to FIG. 6 in that memory 708, central I/O 706 and lock 704 correspond to like elements in FIG. 6. In contrast to FIG. 6, FIG. 7 does illustrate graphically that image 702 is a hard-wired pre-travel image that may be relied on, post-tampering and post-reimaging, to return the device to its pre-travel image.

Figure 8:
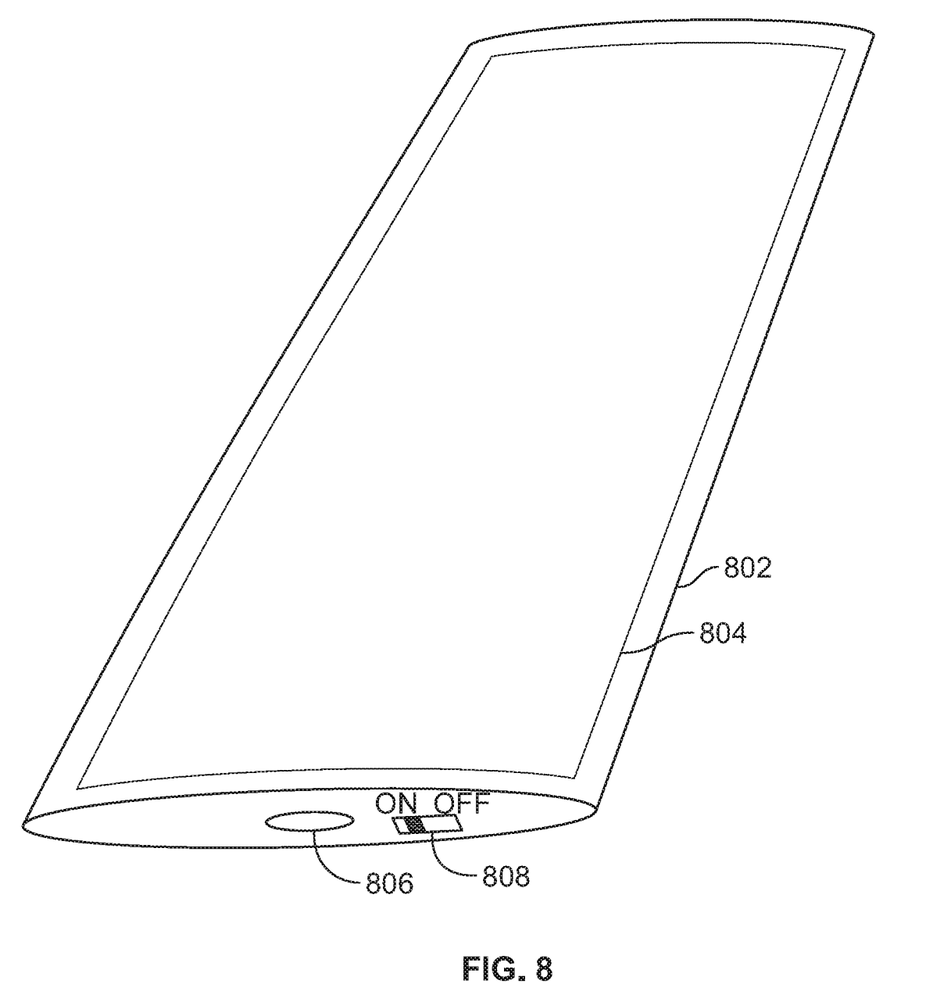
FIG. 8 is a mobile device having a port, and an actuation device for locking the port, in accordance with the principles of the disclosure.

FIG. 8 is a mobile device 802 having a housing 802, a screen 804, a port 806 and a toggleable switch 808. Switch 808 may preferably be used to lock port 806. For the purposes of this application the term "lock" may be understood to mean preventing operation of port 806 such that electronic communications cannot pass through port 806. As such, all attempts at tampering through locked port 806 would not be successful because no electronic communications would be allowed to pass through port 806.

Switch 808, or any other suitable actuation device, may be used by a user to lock port 806. In certain embodiments, toggling of switch 808 may obtain an on/off toggle of port 806 only when switch 808 is toggled in a pre-determined pattern. As such, indeterminate, non-pattern, toggling of switch 808 will not obtain any change of the operability of port 806.

Figure 9:
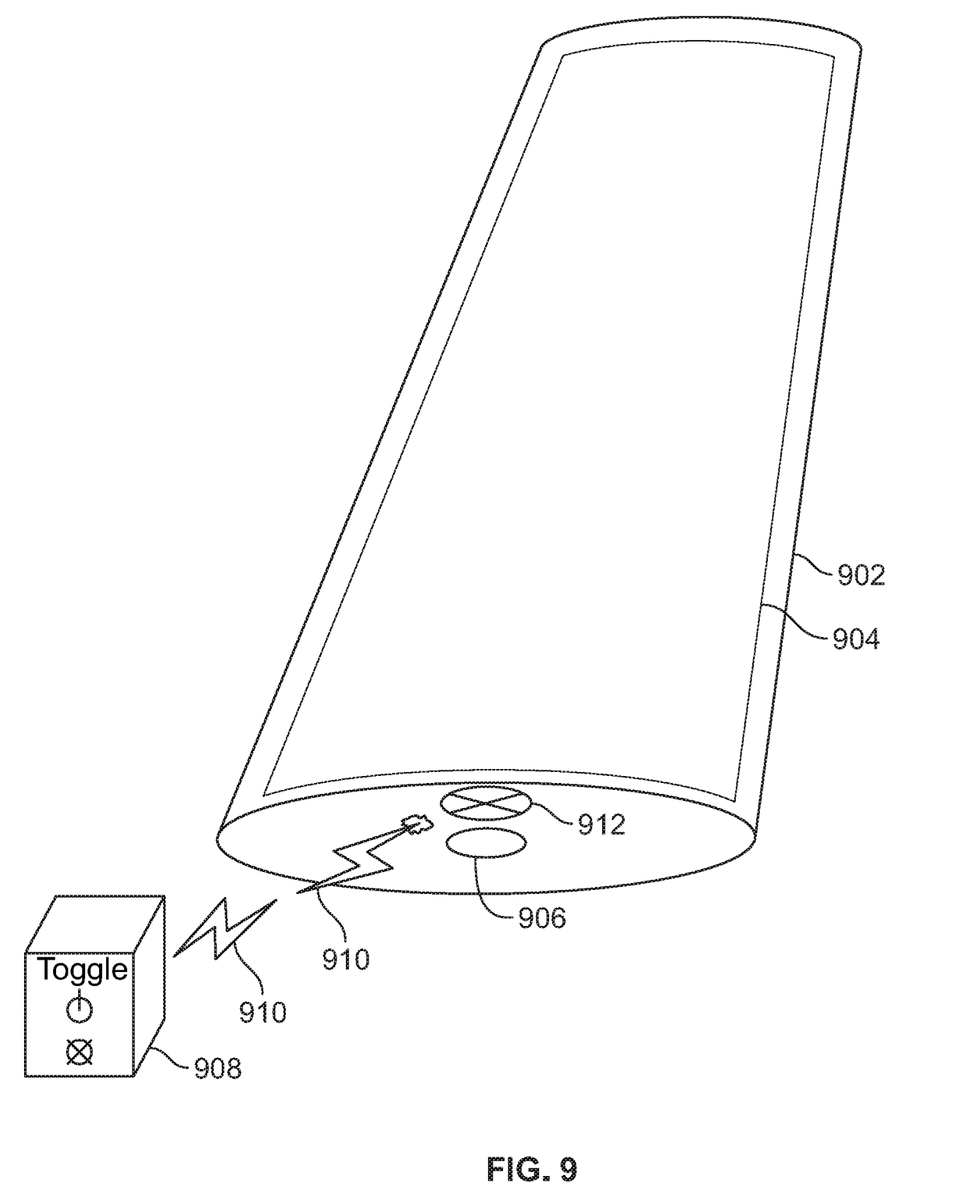
FIG. 9 is a mobile device having a port, and a wirelessly-triggerable device for locking the port, in accordance with the principles of the disclosure.

FIG. 9 shows a mobile device having a housing 902, a screen 904, a port 906, an optional port block indicator 912, and a remote port toggling device 908. Wireless signal indicators are shown at 910.

Port 906 may be a wirelessly-lockable device. As such, port 906 may be locked remotely—e.g., by a wireless signal 910 generated by device 908. For example, when the mobile device is confiscated, the user can use device 908 to generate a wireless locking signal 910—thereby locking port 906 from tampering. Furthermore, some embodiments of the invention may also include a port block indicator 912 that indicates that port 906 is blocked.

Thus, systems and methods involving trusted travel devices have been provided. Persons skilled in the art will appreciate that the present invention can be practiced by other than the described embodiments, which are presented for purposes of illustration rather than of limitation.

What is claimed is:

1. A mobile device comprising enhanced travel security features, the mobile device comprising:
   a memory;
   a settable time clock, said time clock that operates to store a start device confiscation time in the memory and to store an end device confiscation time in the memory;
   at least one monitor device, said monitor device for detecting tampering with the mobile device, the tampering occurring between the start device confiscation time and the end device confiscation time;
   an executable re-image file for re-imaging, upon a command from the mobile device, a software image of the mobile device, said re-image file stored in the memory prior to the start device confiscation time;
   a secure i/o pathway through the memory to the re-image file, the secure i/o pathway passes through the memory, is not secure at an i/o point to the memory, but is secure at an i/o point to the re-image file;
   wherein, after the end device confiscation time and in response to the detecting of said tampering, the mobile device prompts the user for a secure identifier;
   wherein, upon receipt of said secure identifier, said mobile device opens the secure i/o pathway and executes said re-image file.

2. The mobile device of claim 1, wherein the secure i/o pathway is traversable only in response to an input to the mobile device of a user biometric parameter.

3. The mobile device of claim 1, wherein the secure i/o pathway is traversable only in response to an input to the mobile device of a one-time password (OTP).

4. The mobile device of claim 1, wherein the secure i/o pathway is traversable only in response to an input to the mobile device of a user Personal Identification Number (PIN).

5. The mobile device of claim 1, wherein the secure i/o pathway is traversable in response to a combination of an input of two or more of a user biometric parameter, a one-time password (OTP) and a personal identification number (PIN).

6. The mobile device of claim 1 further comprising an external communications port and a toggleable communications port lock, the toggleable port lock for locking down communications through the external communications port.

7. The mobile device of claim 6, wherein the toggleable port lock is a hardware device that presents, at least partially, on an external housing of the mobile device.

8. The mobile device of claim 6, wherein the toggleable port lock is a software device that is toggleable using a remote, wirelessly-enabled, port lock signal generating device.

9. The mobile device of claim 1, wherein at least one of the start device confiscation time and the end device confiscation time is determined by user command.

10. The mobile device of claim 1, wherein the at least one monitoring device is selected from the group consisting of:
   a network traffic monitor device;
   a bandwidth usage monitor device;
   a battery performance monitor device;
   a website presentation monitor device; and
   a central processing usage monitor device.

11. A method of enhancing travel security features associated with a mobile device, the method comprising:
   operating a time clock to store a start device confiscation time in a memory and to store an end device confiscation time in the memory;
   monitoring the mobile device to detect tampering within the mobile device, the tampering occurring between the start device confiscation time and the end device confiscation time; and
   after the end device confiscation time and in response to the detecting of said tampering, prompting the user for a secure identifier;
   upon receipt of said secure identifier, opening a secure i/o pathway to a re-image file, said secure i/o pathway that enables execution of an executable re-image file, the re-image file for re-imaging a software image of the mobile device, said re-image file being stored in the memory, and containing a pre-tampered image of the mobile device;
   wherein the secure i/o pathway passes through the memory, is not secure at an i/o point to the memory, but is secure at an i/o point to the re-image file.

12. The method of claim 1, wherein the secure i/o pathway is traversable only in response to an input to the mobile device of a user biometric parameter.

13. The method of claim 1, wherein the secure i/o pathway is traversable only in response to an input to the mobile device of a one-time password (OTP).

14. The method of claim 1, wherein the secure i/o pathway is traversable only in response to an input to the mobile device of a user Personal Identification Number (PIN).

15. The method of claim 1, wherein the secure i/o pathway is traversable in response to a combination of an input of two or more of a user biometric parameter, a one-time password (OTP) and a personal identification number (PIN).

16. The method of claim 11 further comprising receiving a lock command, said lock command that toggles an external communications port, said toggling of said external communications port that locks down electronic communications through the external communications port.

17. The method of claim 16, wherein said receiving a lock command comprises receiving said lock command on a hardware device, said hardware device that presents, at least partially, on an external housing of the mobile device.

18. The mobile device of claim 17, wherein said receiving a lock command comprises receiving wireless lock command, said wireless lock generated by a remote, wirelessly-enabled, port lock signal generating device.

19. The method of claim 11, wherein at least one of the start device confiscation time and the end device confiscation time is determined by user command.

20. The method of claim 11, wherein the at least one monitoring device is selected from the group consisting of:
   a network traffic monitor device;
   a bandwidth usage monitor device;
   a battery performance monitor device;
   a website presentation monitor device; and
   a central processing usage monitor device.

21. A mobile device comprising enhanced travel security features, the mobile device comprising:
   a memory;
   a settable time clock, said time clock that operates to store a start device confiscation time in the memory and to store an end device confiscation time in the memory;
   at least one monitor device, said monitor device for detecting tampering with the mobile device, the tampering occurring between the start device confiscation time and the end device confiscation time;
   an executable re-image file for re-imaging, upon a command from the mobile device, a software image of the mobile device, said re-image file stored in the memory prior to the start device confiscation time;
   a secure i/o pathway through the memory to the re-image file, the secure i/o pathway being unsecured at an i/o point to the memory but secure at an i/o point within the memory, the i/o point within the memory that provides a traversable gateway to the re-image file;
   wherein, after the end device confiscation time and in response to the detecting of said tampering, the mobile device prompts the user for a secure identifier; and
   wherein, upon receipt of said secure identifier, said mobile device opens the traversable gateway and executes said re-image file.

* * * * *